(12) United States Patent
Schroedl (10) Patent No.: US 9,222,568 B2
(45) Date of Patent: Dec. 29, 2015

(54) BICYCLE POWER TRAIN COGS

(75) Inventor: Brady Schroedl, Whitewater, WI (US)

(73) Assignee: Trek Bicycle Corporation, Waterloo, WI (US)

(*) Notice: Subject to any disclaimer, the term of this patent is extended or adjusted under 35 U.S.C. 154(b) by 201 days.

(21) Appl. No.: 12/985,166

(22) Filed: Jan. 5, 2011

(65) Prior Publication Data

US 2012/0172165 A1 Jul. 5, 2012

(51) Int. Cl.

| | |
|---|---|
| *F16H 55/30* | (2006.01) |
| *B21K 1/30* | (2006.01) |
| *F16H 55/17* | (2006.01) |
| *B62M 9/02* | (2006.01) |
| *B62M 9/10* | (2006.01) |
| *F16H 55/44* | (2006.01) |

(52) U.S. Cl.
CPC .............. *F16H 55/171* (2013.01); *B62M 9/02* (2013.01); *B62M 9/10* (2013.01); *B62M 9/105* (2013.01); *F16H 55/44* (2013.01); *Y10T 29/49464* (2015.01)

(58) Field of Classification Search
CPC .......... B62M 9/10; B62M 9/105; F16H 55/10
USPC ................. 474/160, 152, 153, 155, 156, 157; 29/893.1; D12/123; D15/148
See application file for complete search history.

(56) References Cited

U.S. PATENT DOCUMENTS

| | | | |
|---|---|---|---|
| 3,868,863 A * | 3/1975 | Gasner ........................... 474/158 |
| 3,888,132 A * | 6/1975 | Russ, Sr. ....................... 474/153 |
| 3,962,929 A * | 6/1976 | Silvon ........................... 474/158 |
| 4,030,373 A | 6/1977 | Leonard | |
| D246,097 S | 10/1977 | McGregor, Sr. et al. | |
| 4,099,737 A | 7/1978 | Waugh | |
| 4,545,778 A | 10/1985 | Koivula | |
| 4,768,998 A | 9/1988 | Hirose et al. | |
| 4,846,489 A | 7/1989 | Kleinebenne | |
| 4,909,529 A | 3/1990 | Maguire | |
| 5,054,801 A | 10/1991 | Maguire | |
| 5,061,224 A | 10/1991 | Stuhler | |
| 5,221,236 A | 6/1993 | Raymer et al. | |
| 5,407,395 A | 4/1995 | Krämer | |
| D362,210 S | 9/1995 | Haney | |
| 5,486,143 A | 1/1996 | Ashby | |
| 6,050,916 A | 4/2000 | Hunkert | |
| D435,001 S | 12/2000 | Takamori et al. | |
| D436,561 S | 1/2001 | Louden et al. | |

(Continued)

OTHER PUBLICATIONS 82130.pdf—Mraz, Stephen J., A Carbon Bicycle Chain from Gates, Sep. 24, 2009, Machine Design (http://machinedesign.com), Source URL: http://machinedesign.com/article/a-carbon-bicycle-chain-from-gates-0924.*

(Continued)

*Primary Examiner* — William E Dondero
*Assistant Examiner* — Minh Truong (57) ABSTRACT

A debris venting cog particularly useful for belt driven bicycle power train systems. The cog includes an outer circumferential surface that is shaped to drivingly interact with a flexible drive member such as a belt. The cog includes a number of cavities that are each shaped to interact with a tooth of the belt. A vent fluidly connects at least one cavity to atmosphere and is shaped to direct debris that can accumulate in the cavity or the belt in a radially inward and lateral direction so as to maintain a desired driving interaction between the belt and the cog.

9 Claims, 12 Drawing Sheets

(56) References Cited

U.S. PATENT DOCUMENTS

| | | | |
|---|---|---|---|
| 6,267,699 | B1 | 7/2001 | Gruich et al. |
| 6,503,164 | B2 | 1/2003 | Ito |
| D544,894 | S * | 6/2007 | Clarke .................. D15/148 |
| D545,333 | S | 6/2007 | Clarke |
| D549,258 | S | 8/2007 | Zhu et al. |
| D592,107 | S | 5/2009 | Clarke |
| D604,346 | S | 11/2009 | Chiang |
| D613,207 | S | 4/2010 | Hsu |
| 7,708,297 | B2 | 5/2010 | Thorpe |
| D647,118 | S * | 10/2011 | Parker et al. .............. D15/148 |
| 8,057,337 | B2 * | 11/2011 | Clarke .................. 474/152 |
| 8,092,329 | B2 * | 1/2012 | Wickliffe et al. ........... 474/160 |
| D655,225 | S * | 3/2012 | Schroedl .................. D12/123 |
| 8,136,827 | B2 * | 3/2012 | Lumpkin .................. 280/261 |
| 2004/0092352 | A1 * | 5/2004 | Chiang .................. 474/160 |
| 2004/0220012 | A1 | 11/2004 | Siman-tov |
| 2006/0172841 | A1 * | 8/2006 | San Miguel Nunez et al. .................. 474/156 |
| 2007/0275802 | A1 | 11/2007 | Potma |
| 2008/0190462 | A1 * | 8/2008 | Guldenfels et al. ........... 134/44 |
| 2009/0000921 | A1 * | 1/2009 | Guldenfels et al. ........... 198/834 |
| 2009/0111631 | A1 * | 4/2009 | Wickliffe et al. ........... 474/152 |
| 2009/0236819 | A1 | 9/2009 | Scurlock |

OTHER PUBLICATIONS

2007GatesMudPortsNPL.pdf, A Snagit file captured from http://en.wikipedia.org/wiki/Belt-driven_bicycle.*

* cited by examiner

BICYCLE POWER TRAIN COGS

BACKGROUND OF THE INVENTION

The present invention relates to bicycle power train systems and, more specifically, to debris venting power train cogs that interact with a flexible drive member to communicate rider energy between the pedals and a driven wheel.

Commonly, the front and rear tires of a bicycle are supported by respective drop out assemblies that provide the connection between a skewer, axle or hub of a wheel assembly and the frame of the bicycle. With respect to the rear wheel assembly, a flexible or endless drive, such as a belt or chain, extends between a crankset associated with the pedals, and a gear set that is drivingly associated with the rear wheel. Those skilled in the art will appreciate the structural and vernacular distinctions with respect to bicycle drive systems equipped with a belt as compared to those equipped with a chain. That is, it is appreciated that many belt driven drive system are equipped with pulleys and/or splined drive members or cogs as compared to the many toothed gears associated with chain driven systems.

As used herein, a drive member of the drive train is that portion of the bicycle drive system that is connected to, and directly driven by, the bicycle pedals. A flexible drive or flexible drive member, such as a chain and preferably a belt, is operatively associated with the drive member and communicates a drive force to a driven member. The driven member is operatively associated with a wheel assembly so that rotation of the driven member rotates the wheel assembly. Either or both of the drive and driven member may include more than one drive surface whose interaction with the flexible drive member alters the gearing of the drive train.

Regardless of the type of flexible drive associated with the drive system, the endless drive must be appropriately adjusted so as to maintain a desired operational interaction between the respective drive and driven members of the drive system and the endless drive member. Commonly, with chain and belt systems, the endless drive is adjusted or "tensioned" by adjusting the position of the rear wheel axle relative to an axis of rotation of the drive member or crankset. Operation of a screw or other adjuster, commonly referred to as a tensioner system, linearly translates the axle relative to the crankset until a desired orientation of the drive system is achieved. Efficient operation of the power train depends in large part on the efficient and secure interaction between the flexible drive member and the corresponding cogs or gears. Said in another way, during operation of a bicycle, the flexible drive member must be maintained at a generally constant position relative to each of the drive and driven members to provide efficient interaction between the rider and the drive system and/or to even maintain the operability of the bicycle.

Any debris between the flexible drive member and the drive and driven members of the power train can create a less than desired rider condition and even render the bicycle, at least temporarily, inoperable due to complete derailing of the flexible drive member from the drive system. Radial and/or lateral translation of the flexible drive member in directions away from aligned interaction with the drive and driven members is generally caused by debris disposed between the flexible drive member and the drive and drive members of the drive system Debris such as snow, mud, or rigid debris, such as stones or gravel, captured between the endless drive and the cog or gear can result in damage to the flexible drive member and/or disengagement or unexpected and undesired derailing of the flexible drive member from the rotating drive members.

Chain driven bicycle power trains are somewhat better suited than belt driven power trains to tolerate incidence of debris in the power train. The generally planar and non-overlapping shape of the gears and the omission of any open ended cavities reduces the likelihood that road or other debris will be retained in the gear or sprocket and carried in a location associated with interaction of the gear and the chain. The fairly robust metal structure common to many gears or sprocket and chain drive systems makes it more likely that any debris introduced between the chain and the gear will be most likely small so as to not interfere with operation of the power train and/or crushed or ejected during interaction of the chain and the gear. Furthermore, the generally pointy nature of the teeth of the gears and the repeated insertion and removal of the teeth from the cavities of the chain facilitates maintaining a generally clean and fully operational flexible drive system. Any dirt or debris that may accumulate in the voids of the chain is commonly ejected toward the outside of the chain as the teeth of the gears or sprockets mesh with the chain.

Unlike chain drive bicycle power train systems, many belt driven power train systems have a construction that is opposite the interaction of chain driven power train systems. That is, the belt commonly includes a number of teeth that each individually cooperates with a corresponding cavity formed on a circumferential face of a corresponding cog. Any debris between the cog and the belt becomes captured thereat and detracts from the efficient interaction between the belt and the cog. The generally planar but toothed shape of the belt prevents the venting of debris from the power train in a manner similar to that achieved with chain and sprocket power train systems. Although the belt driven power train systems are generally quieter than chain driven power train systems, such systems are less tolerant and accommodating of debris between the belt and the cog.

Accordingly, there is a need for a cog that cooperates with a belt in a drive or driven manner and which is constructed to accommodate debris so that such debris does not interfere with the efficient interaction between the cog and the belt. There is also a need for a bicycle power train assembly having one or more cogs that vents debris from the power train system in a manner that does not interfere with the operability of the adjacent cogs.

SUMMARY OF THE INVENTION

The present invention provides a belt driven bicycle power train system that addresses one or more of the problems discussed above. According to one aspect of the invention, a debris venting cog according to one aspect of the invention includes an outer circumferential surface that is shaped to interact in a driving or driven manner with a flexible drive member such as a belt. The cog includes a number of cavities that are each shaped to interact with a tooth of the belt. A vent fluidly connects at least one cavity to atmosphere and is shaped to direct debris that can accumulate in the cavity or the belt in a radially inward and lateral direction so as to maintain a desired driving interaction between the belt and the cog.

Another aspect of invention useable with one or more of the above aspects discloses a power train cog having a hub portion and a drive portion. The drive portion of the hub is constructed to drivingly interact with a belt and is oriented circumferentially about the hub portion. The drive includes a plurality of lug cavities that are shaped to receive a tooth of the belt and at least one vent that is fluidly connected to a respective lug cavity. The vent is shaped to direct debris from the lug cavity, when a tooth interacts with the lug cavity, in a direction having both a radial component and a lateral component.

Another aspect of the invention that can be combined or used with one or more of the aspects discussed above discloses a cog assembly of a bicycle power train. The cog assembly includes a body having an axis of rotation that is normal to a plane of rotation of the body. An opening is formed in the body to secure the body to a bicycle. A plurality of drive walls are oriented to engage a tooth of a belt and each drive wall is oriented to extend in a direction that crosses the plane of rotation of the body. A first web wall extends in a circumferential direction between adjacent drive walls. A first debris port is bounded by adjacent drive walls and the first web wall and is shaped to direct debris out of the body in a crossing direction relative to the plane of rotation of the body.

Another aspect of the invention that is combinable with one or more of the aspects or features above includes a method of removing debris from a belt driven bicycle power train. A drive face is formed about a circumferential area of a cog. The drive face is shaped to include a number of cavities that are each shaped to drivingly interact with a tooth of a belt. At least one cavity, and preferably more than one or all of the cavities are vented to atmosphere to discharge debris from the given cavity in a radially inward and lateral direction relative to a plane of rotation of the cog.

Preferably, each tooth cavity is vented or includes a debris port or vent that directly connects the tooth cavity to atmosphere. The cog can include debris ports that face a common lateral side of the cog or the alternate lateral sides of the cog. Those cogs with debris ports facing alternate lateral sides of the cog preferably alternate right and left hand lateral venting with respect to circumferentially adjacent debris ports. In another preferred aspect to the invention, the bicycle power train includes a crankset cog and a wheel hub cog that are each constructed to vent debris from the belt teeth cavities. One or both of the crankset and wheel hub cogs can include more than one cog having different circumferential sizes so as to alter the mechanical advantage provided between the pedals and the driven hub. In a preferred aspect, the adjacent cogs include debris ports that vent in a direction away from the adjacent cog.

These and various other aspects and features of the present invention will be better appreciated and understood when considered in conjunction with the following detailed description and the accompanying drawings. It should be understood that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate one preferred embodiment presently contemplated for carrying out the invention. In the drawings.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENT

Figure 1:
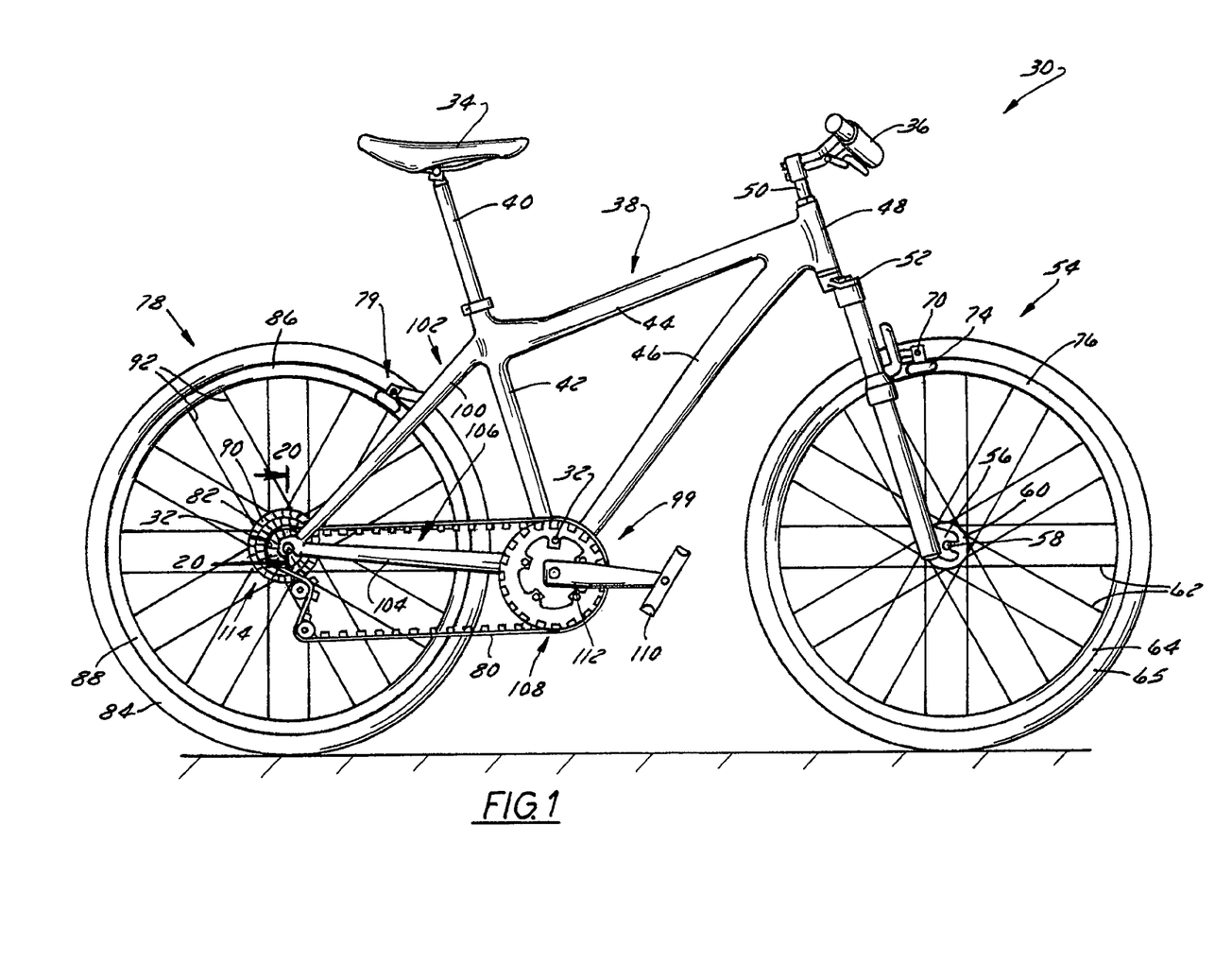
FIG. 1 is a side elevation view of a bicycle equipped with a belt driven power train having crankset and wheel hub cogs according to the present invention.
Figure 2:
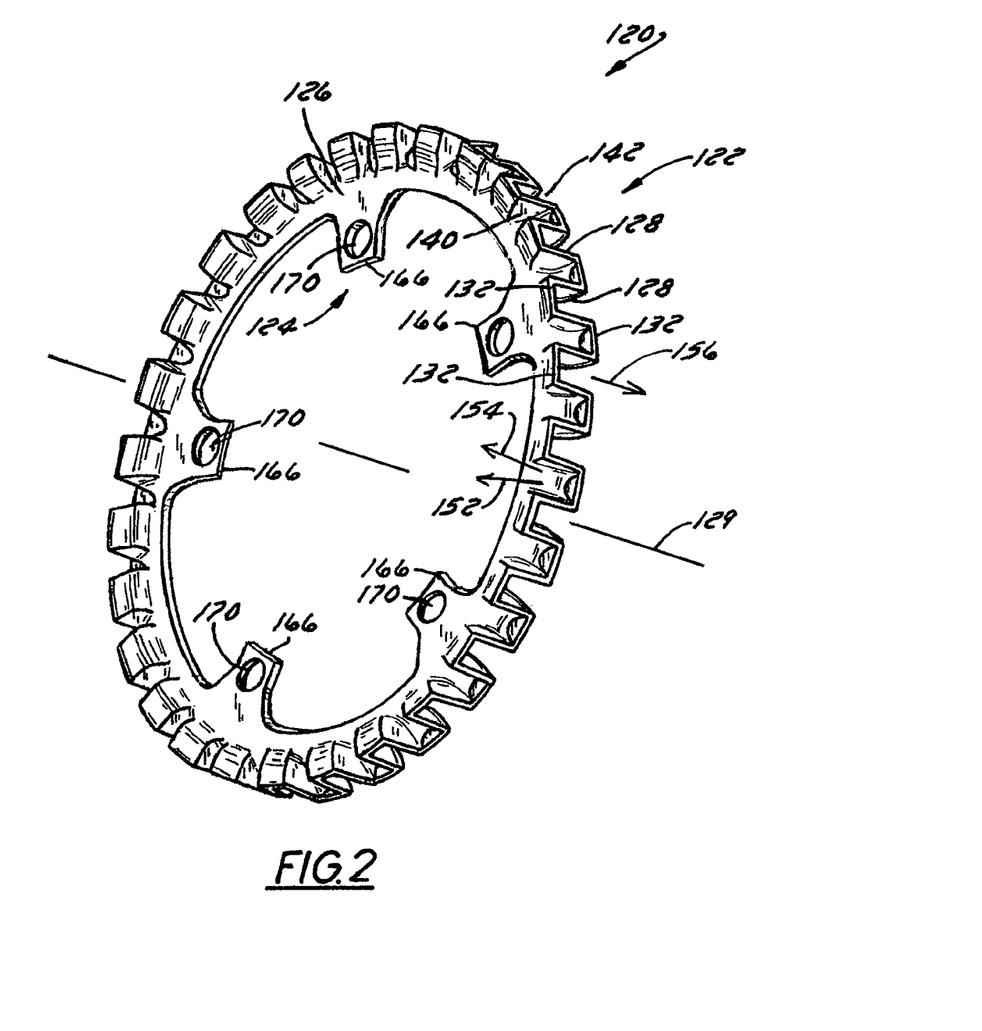
FIG. 2 is a perspective view of one of the cogs of the power train shown in FIG. 1.
Figure 3:
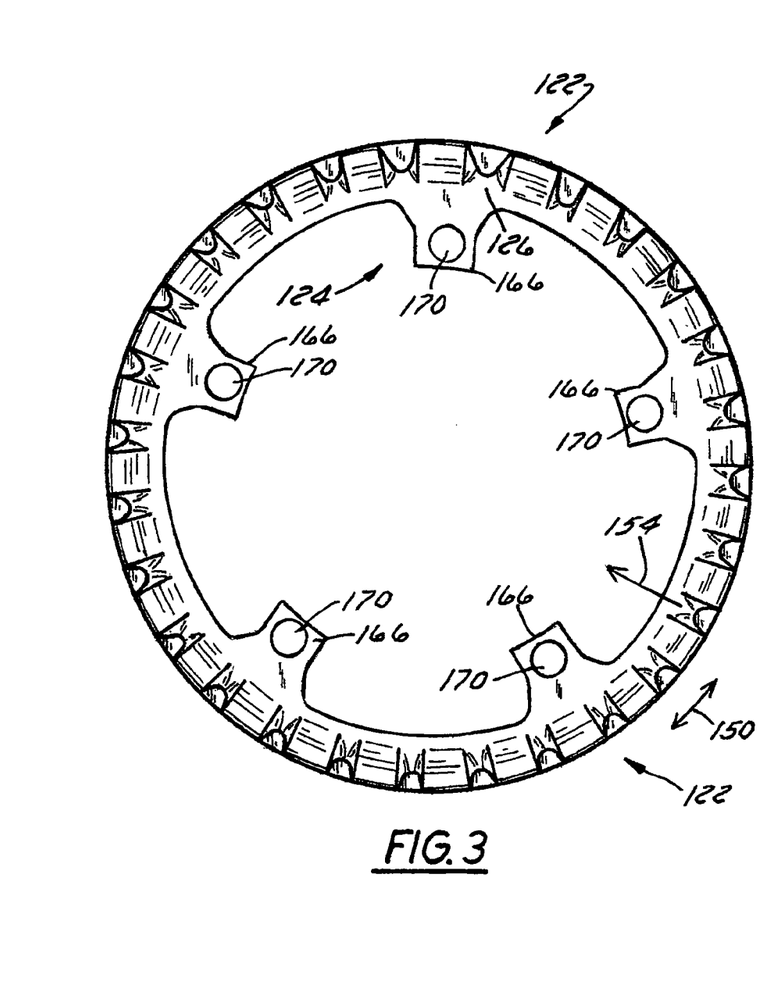
FIG. 3 is a lateral side elevation view of the cog shown in FIG. 2.

FIG. 1 shows a bicycle 30 having at least one power train cog 32 according to the present invention. Bicycle 30 includes a seat 34 and handlebars 36 that are attached to a frame assembly 38 of bicycle 30. A seat post 40 is connected to seat 34 and slidably engages a seat tube 42 of frame assembly 38. A top tube 44 and a down tube 46 extend forwardly from seat tube 42 to a head tube 48 of frame assembly 38. Handlebars 36 are connected to a stem 50 that passes through head tube 48 and engages a fork crown 52.

A pair of forks 53 extend from generally opposite ends of fork crown 52 and are constructed to support a front wheel assembly 54 at an end of each fork or a fork tip 56. Fork tips 56 engage generally opposite sides of an axle 58 that supports a hub 60 of front wheel assembly 54. A number of spokes 62 extend from hub 60 to a rim 64 of front wheel assembly 54. A tire 65 is engaged with rim 64 such that rotation of tire 65, relative to forks 53, rotates rim 64 and hub 60.

Bicycle 30 includes a front brake assembly 70 having an actuator 72 attached to handlebars 36 and a pair of brake pads 74 positioned on generally opposite sides of front wheel assembly 54. Brake pads 74 are constructed to engage a brake wall 76 of rim 64 thereby providing a stopping or slowing force to front wheel assembly 54. A rear wheel assembly 78 includes a similar rim brake assembly 79 although either of front and/or rear wheel assemblies could be provided with rotor type braking assemblies. Regardless of the specific configuration of the respective braking system, similar to front wheel assembly 54, rear wheel assembly 78 also includes a skewer, shaft, or axle 82 that secures rear wheel assembly 78 to frame assembly 38 of bicycle 30.

Rear wheel assembly 78 includes a tire 84 that is supported by a wheel 86. Wheel 86 includes a rim 88 that is offset from a hub 90 by a number of spokes 92. Alternatively, wheel 86 could include laterally opposite discs that extend between rim 88 and hub 90. Hub 90 cooperates axle 82 such that wheel 86 rotates about an axis of rotation defined by axle 82 relative to frame assembly 38 during use of bicycle 30. As will be described further with respect to FIGS. 2-7, rear wheel assembly 78 and axle 82 can be selectively positioned relative to bicycle 30 to tension a flexible drive member, such as a belt 80 of a drive train 99 of bicycle 30. Preferably, flexible drive member 80 is formed of a fairly robust but pliable material such as reinforced carbon fiber material.

Frame assembly 38 includes a pair of seat stays 100, 102 and a pair of chain stays 104, 106 that offset rear axle 82 from a crankset 108 of bicycle 30. As described further below, stays 100, 102, 104, 106 are oriented to generally flank rear wheel assembly 78. Preferably, seat stays 100, 102 and chain stays 104, 106 are positioned on and support the generally laterally opposite sides axle 82 of wheel assembly 78. Understandably, it is envisioned that a single chain stay and a single seat stay of robust construction could be provided such that wheel assembly 78 could be mounted in a lateral cantilevered fashion relative thereto.

Crankset 108 includes a set of pedals 110 that are operationally connected to belt 80 via a drive member such as a chain ring, sprocket or drive cog 112. As explained further below with respect to FIGS. 17-21, although crankset 108 is shown as having only one cog 112, it is envisioned that crankset 108 can include more than one cog having an alternate operating diameter thereby increasing the gearing ratios that can be achieved with drive train 99. Like a chain bicycle drive train, rotation of belt 80 communicates a drive force to a rear section or driven element(s), pulley(s), gear(s), or cog(s) that, in a multi-ratio free-wheel capable configuration, is commonly referred to as a cassette 114. Rotation of belt 80 drives cassette 114 which is turn rotates rear wheel assembly 78 so as to propel bicycle 30 in a forward direction.

Understandably, crankset 108 and cassette 114 can each include one or more variable diameter drive members or cogs so that drive train 99 can be operated at a number of gearing ratios. That is, it is envisioned that a bicycle incorporating the present invention include one drive member at the crankset and the cassette to provide a fixed ratio drive train, be provided with more than one variable diameter drive member at either the crankset or the cassette to provide a variable ratio drive train, and/or be provided with an internal or alternate transmission system to provide a variety of drive train ratios regardless of the specific number of drive members provided at the crankset or the cassette. Examples of such systems are disclosed in U.S. Pat. Nos. 7,029,424; 5,061,224; 4,973,289; 4,925,201; 4,781,663; and 4,772,250 and U.S. Patent Application Publication No. 2005/0233846, the disclosures of which are incorporated herein.

It is further appreciated that the construction of the drive train members or cogs will also vary as a function of the type of flexible drive 80. That is, the construction and operation of the drive train members associated with crankset 108 and/or cassette 114 when flexible drive 80 is provided as a belt will most likely not be the same as those associated with drive train systems equipped with a chain. Regardless of the specific material and/or shape of the construction of the flexible drive member, the drive train members or cogs preferably interfere with the flexible drive member in a manner such that the flexible drive member includes a projecting or male structure that interfering cooperates with a cavity or female structure associated with each of respective cog. Such differences are readily appreciated. It is envisioned that the present invention be usable with belt and/or chain, single and multiple driven member crankset and wheel cassettes, bicycle drive train systems.

Regardless of the specific modality of flexible drive 80 and the driving arrangement for interacting with the flexible drive 80, forward rotation or clockwise operation (when viewed from a right hand of lateral drive side of bicycle 30) of drive cog 112 interacts with at least one driven cog associated with rear wheel assembly 78 or a cassette 114 to rotate wheel 86 in a clockwise or forward driving direction. Cassette 114 is generally concentrically orientated with respect to rear axle 82. Cassette 114 is operationally connected to hub 90 of a rear wheel 86 of rear wheel assembly 78. As is commonly understood, rider operation of pedals 110 powers drive train 99 to drive belt 80 and thereby drive rear wheel 86 which in turn propels bicycle 30. Alternatively, rather than being provided with a free-wheel configuration, it is envisioned that one or more cogs as disclosed below can be directly to secured to hub 90 of rear wheel 86 to impart the driving force thereto.

FIGS. 2-6 show various views of a cog 120 according to one embodiment of the present invention and removed from bicycle 30. Referring to FIGS. 2-6, cog 120 includes a drive portion 122 and a hub portion 124. Drive portion 122 is oriented radially outward relative to hub portion 124 of cog 120. Cog 120 is generally ring shaped as defined by a body 126 of cog 120. Drive portion 122 includes a number of drive walls 128 that extend in a lateral direction, or a direction generally aligned with an axis of rotation, indicated by line 129 (FIG. 2), of cog 120. Said another way, drive walls 128 are generally aligned with a lateral direction, indicated by line 130 with respect to a plane of rotation of cog 120. Although drive walls 128 are shown as being generally normal and linear with respect to a plane of rotation of cog 120, it is envisioned that drive walls 128 could have other shapes that correspond to the shape of the teeth of belt 80 and/or provide a desired driving interaction therewith.

Figure 4:
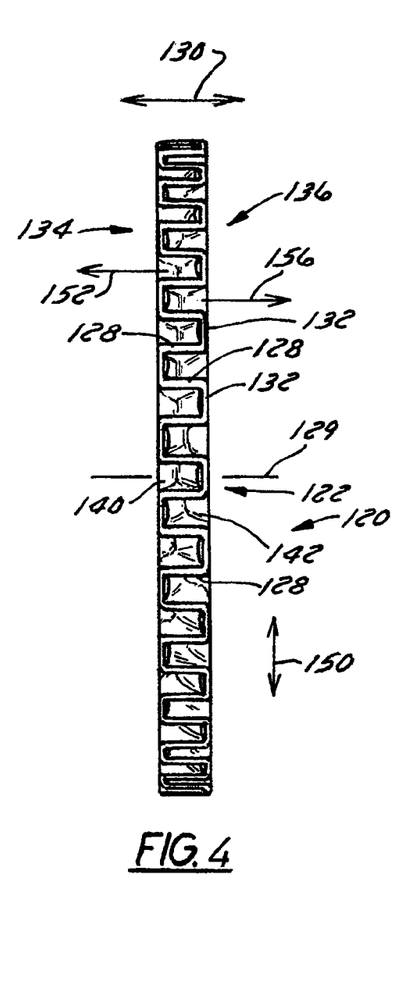
FIG. 4 is an elevation view of the cog shown in FIG. 3 from a vantage normal to the elevation view shown in FIG. 3.
Figure 5:
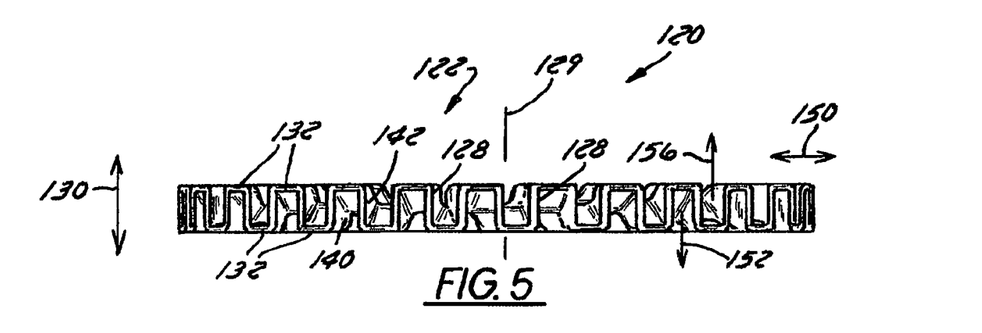
FIG. 5 is a view similar to FIG. 4 taken from a different radial vantage of the cog shown in FIG. 3.

Adjacent drive walls 128 are connected by web walls 132. Web walls 132 are positioned on opposite lateral sides 134, 136 of cog 120. As best shown in FIGS. 4-5, drive walls 128 and web walls 132 extend in crossing directions relative to one another and are connected about the circumference of cog 120 so as to form a generally serpentine pattern.

Drive portion 122 of cog 120 also includes a number of vents, pockets, chambers, recesses, or cavities 140, 142 that are defined by adjacent drive walls 128 and a respective connecting web wall 132 that extends between the adjacent drive walls. As described further below with respect to FIGS. 17-21, each cavity 140, 142 of cog 120 is constructed to cooperate with a respective projection, lug, or tooth of flexible drive member 80. Drive walls 128 cooperate with a respective tooth of the flexible drive member 80 to effectuate efficient communication of a driving or rotational force, indicated by arrow 150, between the flexible drive member 80 and cog 120.

Web walls 132 maintain a desired lateral alignment between flexible drive member 80 and cog 120. Web walls 132 reduce the incidence of undesired lateral translation, or translation in directions 130, of flexible drive member 80 relative to cog. Such a construction prevents undesired disengagement of belt 80 from cog 120.

Figure 6:
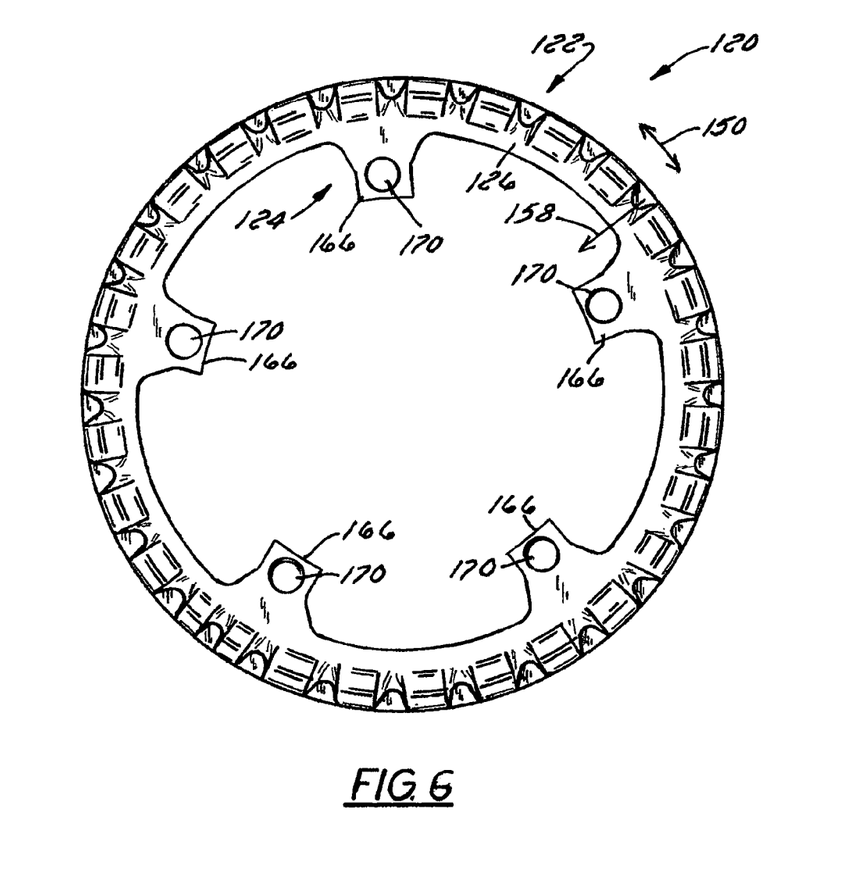
FIG. 6 is an elevation view similar to FIG. 3 and shows an opposite lateral side of the cog shown in FIG. 3.
Figure 7:
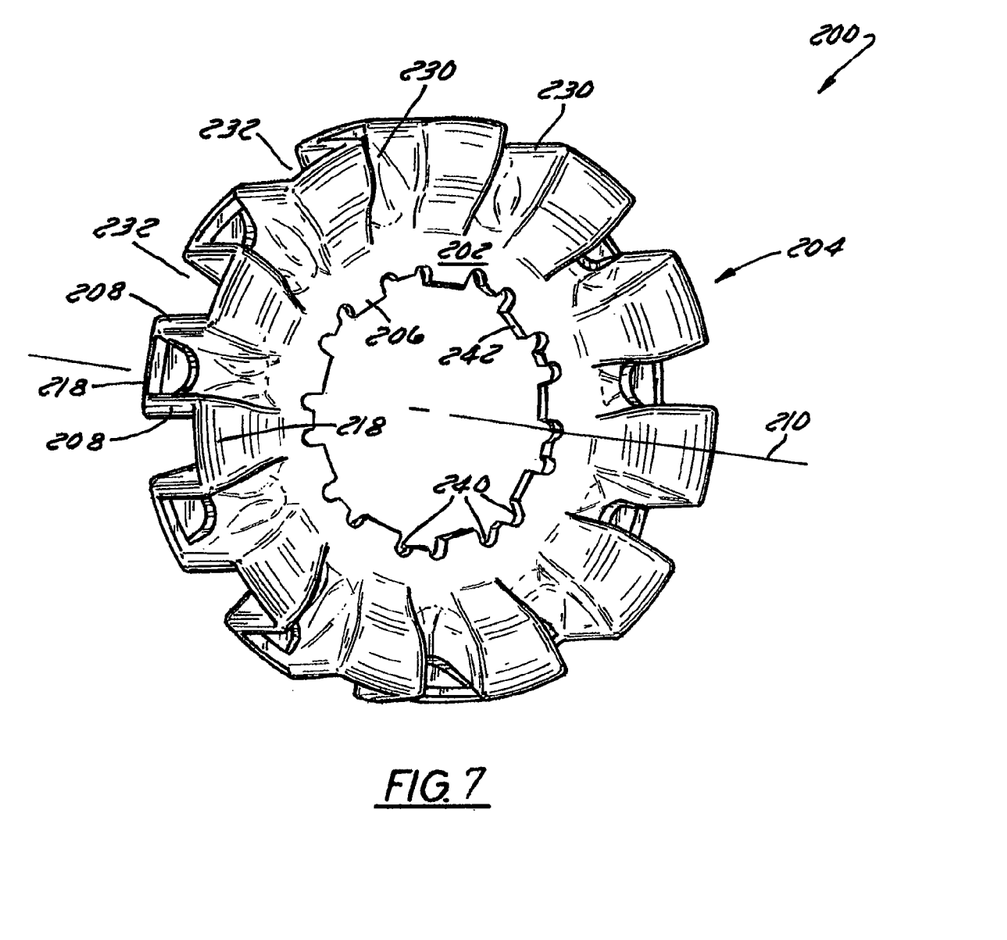
FIG. 7 is a view similar to FIG. 2 and shows a cog according to another embodiment of the invention.
Figure 8:
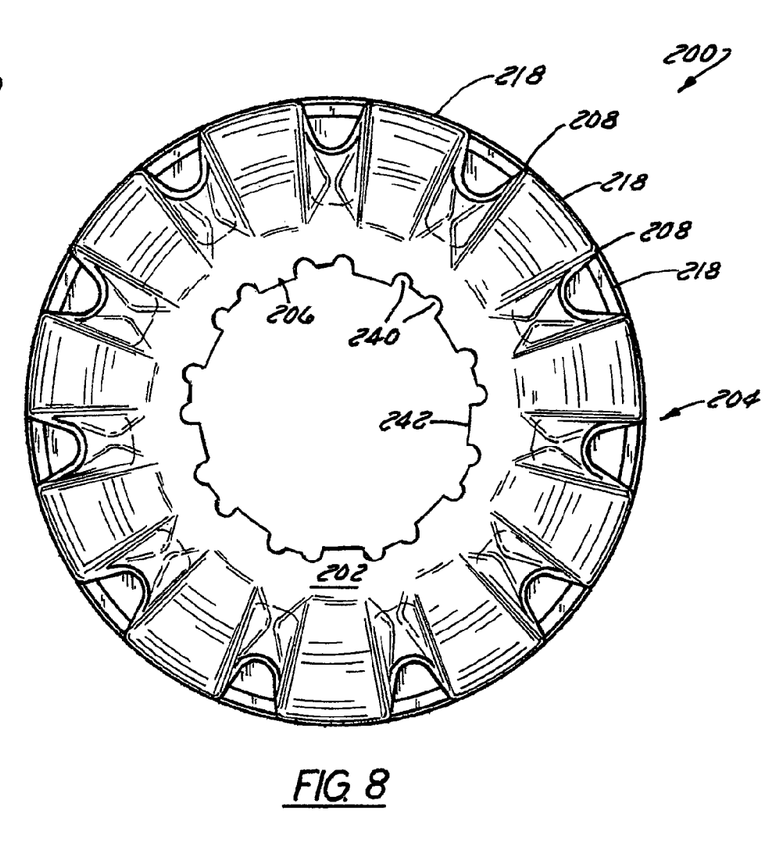
FIG. 8 is a lateral side elevation view of the cog shown in FIG. 7.
Figure 9:
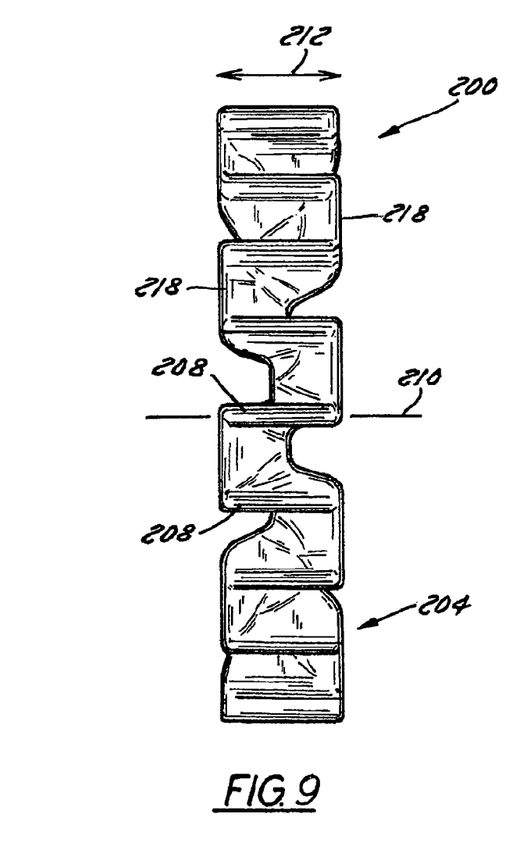
FIG. 9 is an elevation view of the cog shown in FIG. 8 from a vantage normal to the elevation view shown in FIG. 3.
Figure 10:
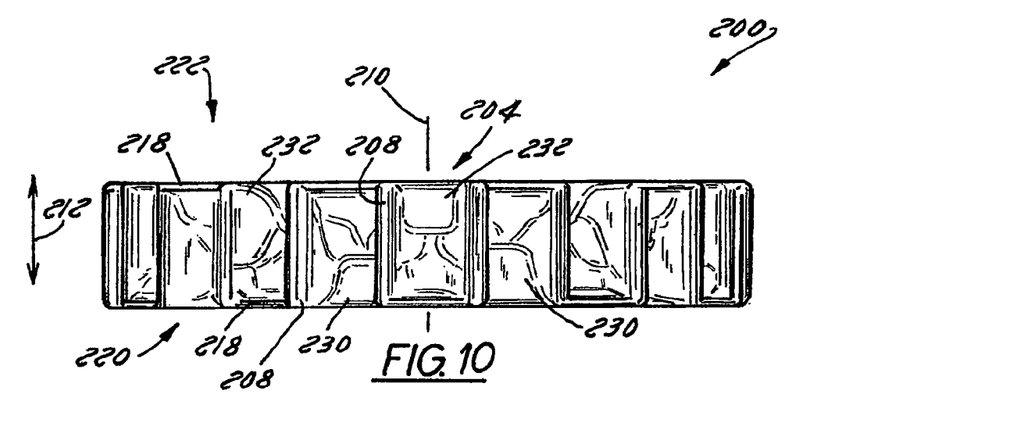
FIG. 10 is a view similar to FIG. 9 taken from a different radial vantage of the cog shown in FIG. 9.
Figure 11:
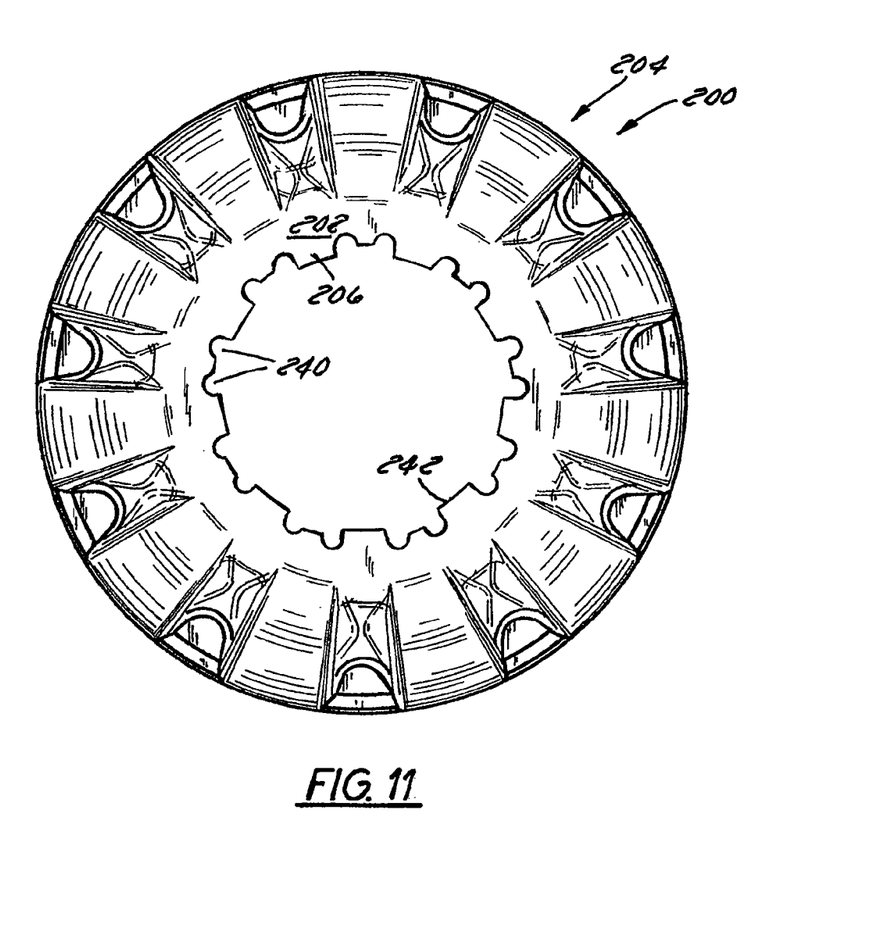
FIG. 11 is an elevation view similar to FIG. 8 and shows an opposite lateral side of the cog shown in FIG. 8.

Each cavity 140 defined by adjacent drive walls 128 and a corresponding web wall 132 is shaped to direct dirt, snow, debris or other material that may collect therein in both a lateral direction, indicated by arrow 152 (FIG. 4) and in an inward radial direction, as indicated by arrow 154 (FIG. 3) during engagement of a tooth of the flexible drive 80 with the respective cavity 140. Comparatively, each cavity 142 is shaped to direct similar such materials in an opposite lateral direction, indicated by arrow 156 (FIG. 4) and in a similar inward radial direction, indicated by arrow 158 (FIG. 6). Such a construction prevents any debris that may collect in cavities 140, 142 from forcing flexible drive member 80 out of a desired operative engagement with cog 120 and directs such material in a radially inward and opposite lateral directions out of cavities 140, 142, respectively. Said in another way, cog 120 is constructed to vent debris in opposite lateral directions as well as a radially inward direction with respect to body 126 of cog 120.

Hub portion 124 of cog 120 includes a number of flanges 166 that extended in an inward radial direction relative to drive portion 122 of cog 120 and toward axis 129. One or more of flanges 166 include an opening 170 that is shaped to cooperate with a fastener or other securing means for securing cog 120 relative to any of hub 90, crankset 108, cassette 114, and/or adjacent cogs associated with drive train 99. As explained further below with respect to FIGS. 17-21, it is envisioned that one or more of cogs 120 be secured to bicycle to provide either a fixed gear or a multiple gear bicycle drive train.

FIGS. 7-11 show a cog 200 according to another embodiment of the invention. Cog 200 includes a body 202 that includes a drive portion 204 that is positioned circumferentially around a hub portion 206. Drive portion 204 includes a number of drive walls 208 that are generally aligned with an axis of rotation, indicated by arrow 210, of cog 200. Said another way, drive walls 208 extend in lateral directions, indicated by arrow 212, relative to a plane of rotation of cog 200. Drive walls 208 are configured to operatively interact with the teeth of flexible drive member 80.

Adjacent drive walls 208 are connected by web walls 218 that are oriented about the opposite lateral sides, 220, 222 of cog 200. Like cog 120, adjacent drive walls 208 and respective web walls 218 of cog 200 defined cavities, ports, or vents 230, 232 that are shaped to eject or directionally dispel dirt, debris, or other materials from cog 200. Vents 230 are shaped to direct debris in a radially inward direction and a lateral direction toward first lateral side 220 of cog 200 whereas vents 232 are shaped to eject material disposed therein in a radially inward direction and a lateral direction toward opposite lateral side 222 of cog 200. Similar to cog 120, adjacent cavities 230, 232 of cog 200 eject debris in partially opposite directions that include both a lateral direction component and a radially inward direction component.

Hub portion 206 of cog 200 includes a number of notches 240 that extend circumferential about an inner edge 242 of body 202 of cog 200. Notches 240 are spaced and shaped for securing cog 200 relative to any of hub 90, crankset 108, cassette 114, and/or adjacent cogs associated with drive train 99. Although inner edge 242 is shown as having a generally non-circular shape, such a shape is merely exemplary in that inner edge 242 could have virtually any shape. The non-circular shape of edge 242 provides for convenient orientation of cog 200 relative to the adjacent structure of the underlying drive train 99 and provides an interaction that allows for the secure communication of the rotation forces imparted to cog 200 to the desired structure of bicycle 30.

FIGS. 12-16 show a cog 300 according to yet another embodiment of the invention. Cog 300 is formed by a body 301 that defines a drive portion 302 that is circumferentially oriented about a hub portion 304. Drive portion 302 includes a number of drive walls 308 that are positioned about the radially outer conference of cog 300. Drive walls 308 are aligned in a lateral direction, indicated by arrow 310, to be in a crossing orientation relative to a plane of rotation of cog 300. Said another way, drive walls 308 are generally aligned with an axis of rotation, indicated by line 312, of cog 300.

A web wall 314 connects adjacent drive walls 308. Adjacent web walls 314, with respect to the circumferential direction of drive portion 302 of cog 300, are positioned on opposite lateral sides 320, 322 of cog 300. Like cogs 120 and 200, the generally serpentine pattern of drive walls 308 and web walls 314 provides an interface that maintains efficient interaction with the flexible drive member 80 as well as limiting undesired lateral translation 310 of the flexible drive member 80 with respect to the axis of rotation of cog 300. Cog 300 includes a number of openings, passages, ports, or vents 330 that are defined by adjacent drive walls 308 and a respective web wall 314.

Figure 12:
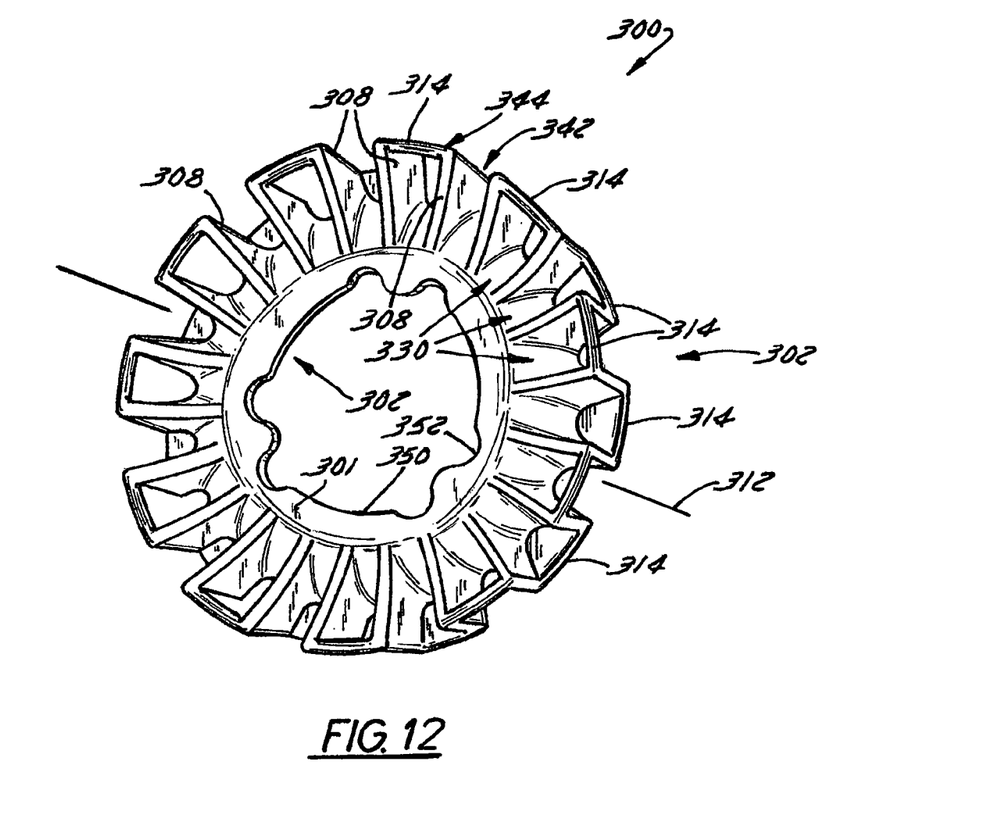
FIG. 12 is a view similar to FIGS. 2 and 7 and shows a cog according to another embodiment of the invention.
Figure 13:
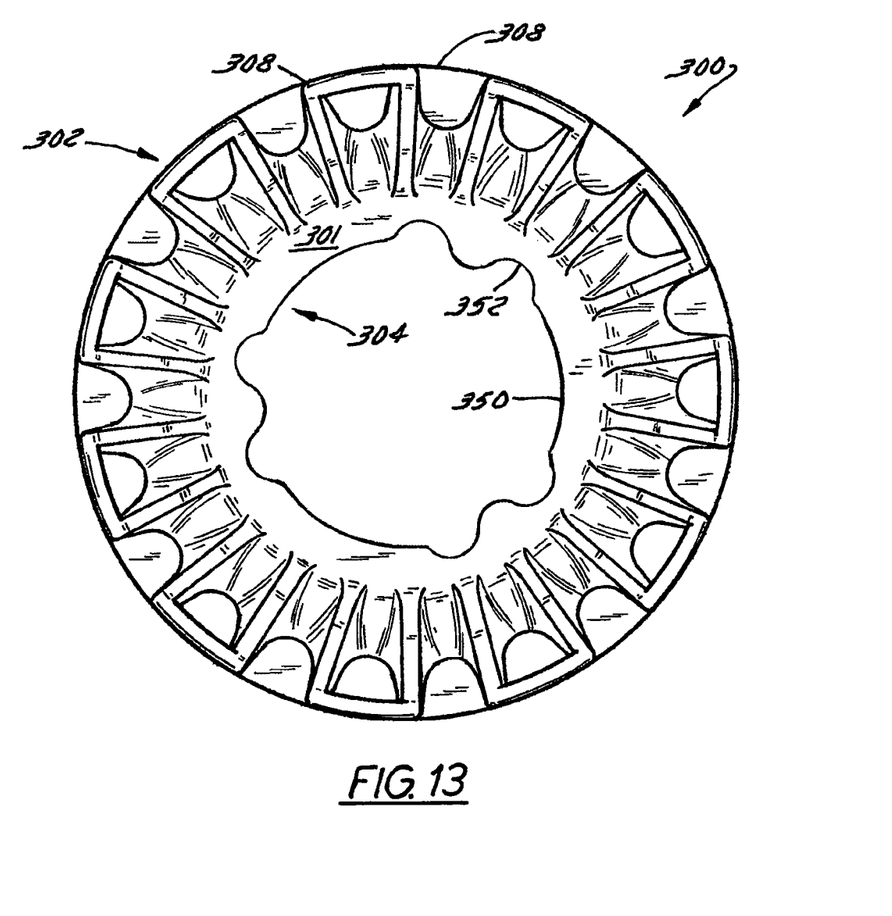
FIG. 13 is a lateral side elevation view of the cog shown in FIG. 12.
Figure 14:
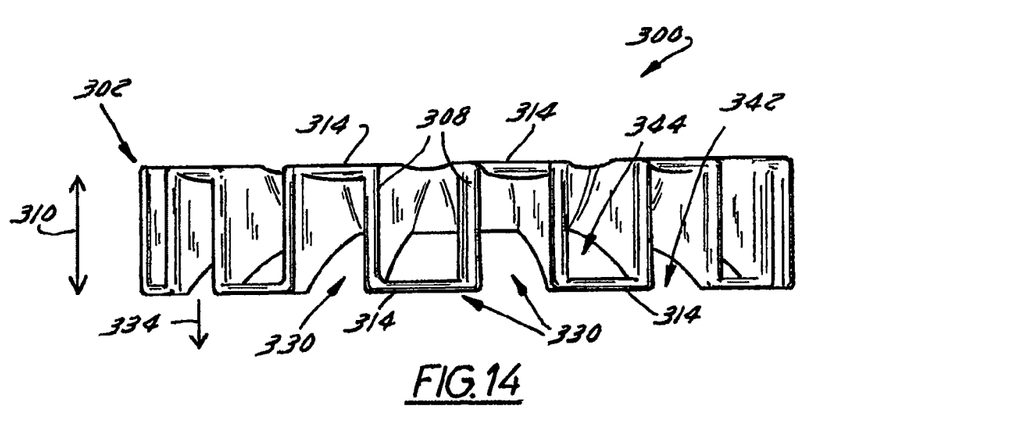
FIG. 14 is an elevation view of the cog shown in FIG. 13 from a vantage normal to the elevation view shown in FIG. 13.
Figure 15:
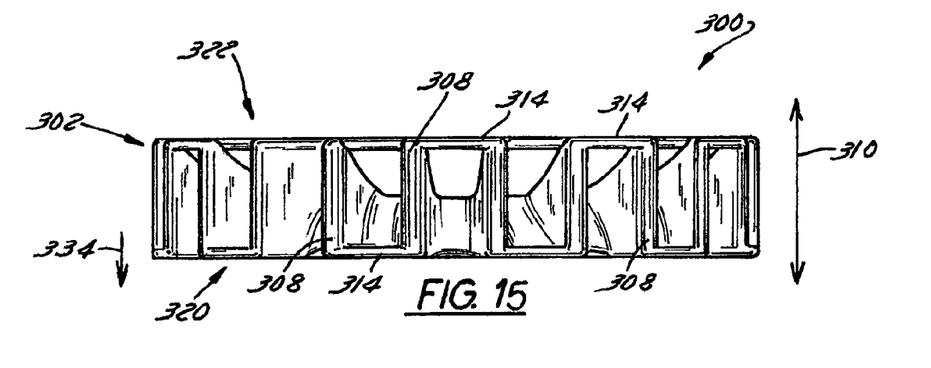
FIG. 15 is a view similar to FIG. 14 taken from a different radial vantage of the cog shown in FIG. 14.
Figure 16:
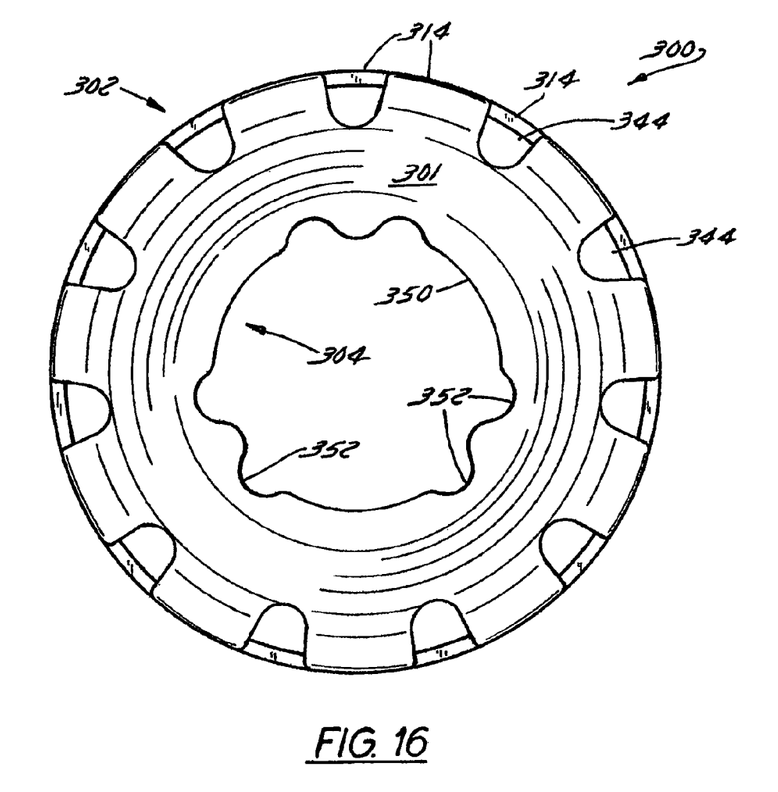
FIG. 16 is an elevation view similar to FIG. 13 and shows an opposite lateral side of the cog shown in FIG. 13.
Figure 17:
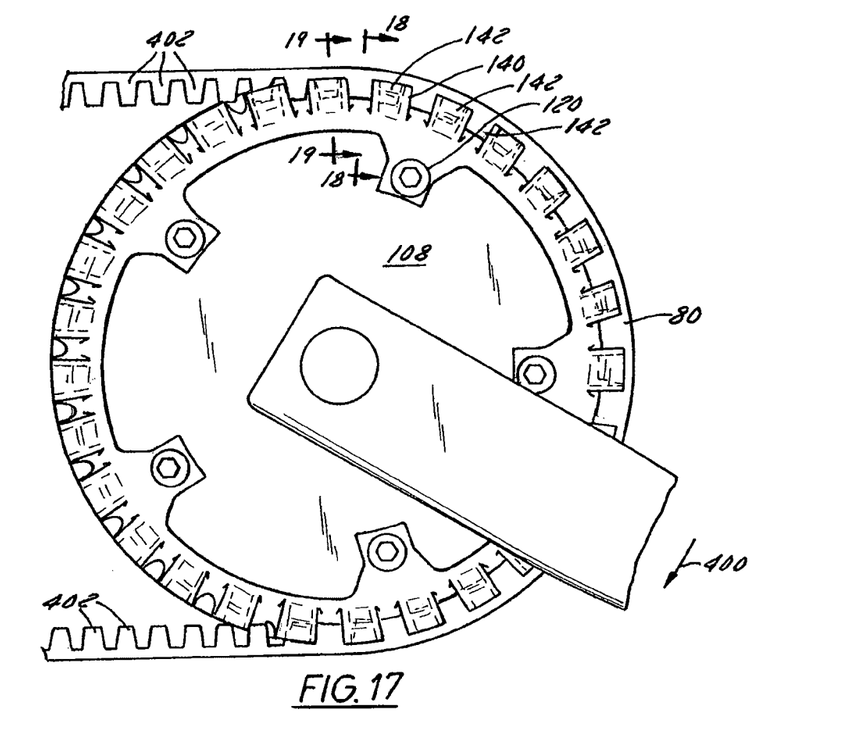
FIG. 17 is an elevation view of a crankset portion of the power train of the bicycle shown in FIG. 1.

Like cogs 120, 200, cog 300 is constructed to discharge or dispel dirt, foreign materials, and/or debris collected in cavities 330 in a partially radially inward direction. Unlike cogs 120, 200, cog 300 is constructed to eject such material from adjacent vents 330 in a common lateral direction, indicated by arrow 334, with respect to the opposite lateral sides 320, 322 of cog 300. As best shown in FIG. 14, the alternating lateral orientations of web walls 314 defines a first series of passages 342 and a second series of passages 344 of cavities 330. Referring to FIG. 12, a web wall 314 associated with a respective second passage 344 extends over cavity 330 between adjacent drive walls 308 such that debris or other foreign material is dispelled under the respective web wall. Body 301 of cog 300 is shaped to direct preferably a majority of any debris or foreign material collected in cavities 330 toward lateral side 320 of cog 300 regardless of the orientation of the respective web wall 314 relative to the lateral sides 320, 322 of cog 300.

Like cogs 120 and 200, cog 300 includes a radially inner edge 350 that is shaped to include a number lobes 352. Like inner edge 242 of cog 200, edge 350 and lobes 352 of cog 300 allow the efficient and secure attachment of cog 300 to one or more of hub 90, crankset 108, cassette 114, and/or adjacent cogs associated with drive train 99.

Referring to FIGS. 17-21, cog 120 is constructed to be secured to one or more of crankset 108 of bicycle 30 and cassette 114 secured to rear wheel assembly 78. Regardless of the position of cog 120 with respect to bicycle 30, drive portion 122 is shaped to matingly cooperate with flexible drive member 80. As is commonly understood, flexible drive 80 engages only a radial portion of cog 120 at any given instant during operation of bicycle 30. During a pedaling operation, indicated by arrow 300, user forces input to crankset 108 are imparted to belt 80 via the toothed interaction of belt 80 and cog 120. Belt 80 includes a number of teeth 402 that are spaced to cooperate with adjacent cavities 140, 142 of cog 120.

Figure 18:
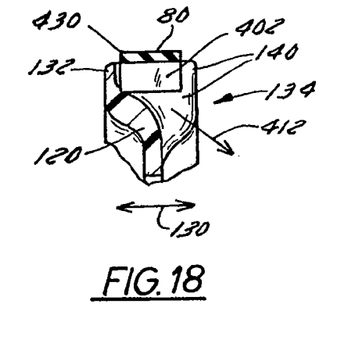
FIG. 18 is a cross section view of a portion of the power train taken along line 18-18 shown in FIG. 17.
Figure 19:
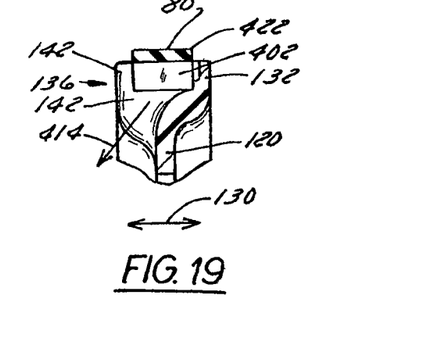
FIG. 19 is a view similar to FIG. 18 and taken along line 19-19 shown in FIG. 17.

Referring to FIGS. 18 and 19, during interaction of flexible drive member 80 with cog 120, introduction of a respective tooth 402 of belt 80 into a respective cavity 140, 142 of cog 120 forces dirt, snow, debris, or other foreign material that may accumulate in cavities 140, 142 of cog 120 toward a respective lateral side 134, 136 of cog 120. As indicated by arrows 412, 414, such material is directed in a radially inward and a lateral direction with respect to the drive portion 122 of cog 120. Web walls 132 loosely interact with the opposite lateral sides 420, 422 of belt 80 and prevent undesired lateral translation 130 of belt 80 relative to cog 120. The directed debris or foreign material venting configuration of the interaction of cog 120 with belt 80 reduces the potential for undesired disengagement of belt 80 from cog 120 and further limits incidence of partial interaction of teeth 402 of belt 80 with the drive walls 128 of cog 120. That is, allowing the discharge of the foreign material of cavities 140, 142 allows the interaction of teeth 402 with cog 120 to eject the material in a direction that is generally aligned with the direction of interaction of the flexible drive member 80 with cog 120.

Figure 20:
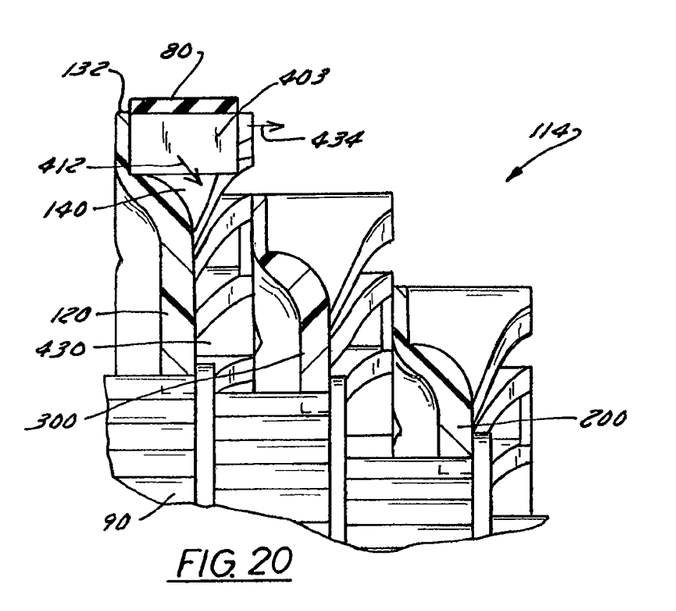
FIG. 20 is cross section view of a portion of the wheel gear set of the power train taken alone line 20-20 shown in FIG. 1.
Figure 21:
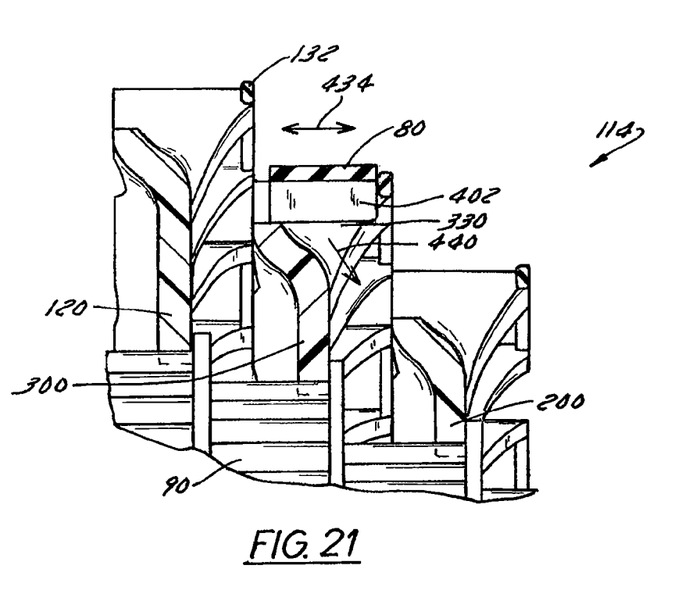
FIG. 21 is a view similar to FIG. 20 and shows the flexible drive member engaged with an alternate cog thereof.

FIGS. 20 and 21 show an exemplary configuration of cassette 114 that can be achieved to provide bicycle 30 with a variable gearing drive train 99. Cogs 120, 200, 300 are shaped to be operationally secured to hub 90 of bicycle 30. Although cogs 120, 200, 300 are shown as being secured to a freewheeling cassette structure, it is further envisioned that cogs 120, 200, 300 could be secured to other structures and/or directly to hub 90 to provide a driving arrangement therebetween. Although cassette 114 is shown as having three distinct operating gears, it is further envisioned that crankset 108 as well as cassette 114 could each be provided with one or more cogs of variable diameters to provide a bicycle having a plethora of gearing operations. It is further envisioned that cogs 120, 200, 300 could alternatively be secured to one another in a generally stacked relationship for conveniently securing the driving members to bicycle 30.

Independent of the connection methodology, cogs 120, 200, and 300 are maintained in a generally close lateral association and provide variable operating diameters for interaction with belt 80. Although cassette 114 is equipped with one of each of cogs 120, 200, 300, it is further envisioned that either the crankset or the cassette of bicycle 30 could be equipped with more than one of any of cogs 120, 200, or 300 and that the cogs of such a configuration need only vary the operating diameter of the respective cog to provide a bicycle with the multiple geared configuration.

Each of cogs 120, 200, 300 are positioned in close proximity to one another but sufficiently spaced to tolerate interaction with belt 80 without interference from adjacent cogs 120, 200, 300. It is envisioned that, when provided in a multiple geared format, bicycle 30 be equipped with a front and/or a rear derailleur assembly to facilitate the manual lateral manipulation of the flexible drive member 80 in effectuating shifting of the gearing arrangement of bicycle 30 such that flexible drive member 80 cooperate with one of cogs 120, 200, or 300 as desired. Like chain drive power trains, such a derailleur assembly would also accommodate the excess length of belt 80 associated with engagement with the cogs having a reduced operating diameter, such as cog 200 with respect to cogs 120 and cog 300 and cog 300 with respect to cog 120.

Referring to FIG. 20, during interaction of belt 80 with cog 120 each tooth 402 of flexible drive member 80 dispels debris or other material that may accumulate in cavity 140 of cog 120 in direction 412 toward cog 200 and/or a cavity 430 formed between adjacent cogs. Regardless of the specific direction and/or destination associated with the material discharged from cavity 140, such material is ejected from cog 120 so that the material cannot interfere with a desired operative interaction between the respective tooth 402 and cog 120. As explained above, manipulation of the guide device, such as a derailleur overcomes the desired lateral alignment of belt 80 with cog 120 provided by the cooperation of web walls 132 with teeth 402 to translate belt 80 in a lateral direction, indicated by arrow 434, and into engagement with adjacent cogs, such as cogs 200, 300. Understandably, if provided as a single gear bicycle assembly and/or a bicycle assembly having an internal transmission as discussed in the background above, such a derailleur assembly would be unnecessary.

Referring to FIG. 21, tooth 402 of belt 80 cooperates with cavities 330 of cog 300 to provide an alternate gearing of drive train 99 and in a manner that also dispels debris from cavity 330 in a radially inward and lateral direction, indicated by arrow 440, to maintain a desired operative interaction between belt 80 and cog 300. Belt 80 is configured to cooperate with cog 200 in a similar manner such that material that may collect in one of the cavities of the respective cogs 120, 200, 300 can be dispelled from the cog during interaction of the respective cog with the belt. Such a configuration provides a bicycle belt driven power train that is less susceptible to the undesirable effects associated with the collection of the material in the drive portion of the respective cog.

It is further appreciated that any of cogs 120, 200, 300 could be provided in a number of diameters and a number of hub portion configurations to provide a desired stacking of a desired number of cogs and a desired directional venting configuration. For example, cogs 120, 200, 300 could each be provided in more than one diametrical size to allow the formation of a cassette assembly having multiple similar appearing, but differently sized cogs. It is further appreciated that a drive train could be provided having a stacked cog association wherein each of the respective cogs vents debris or other material in a common lateral side, alternate lateral directions, and/or a configuration wherein respective cogs of the cassette assembly are configured to send debris in a desired lateral direction. Regardless of the specific lateral direction of the venting of each respective cog, each of cogs 120, 200, 300 provides venting of debris in one or both lateral direction and a radially inward direction to maintain a desired interaction between belt 80 and the respective cog.

It is further envisioned that the lateral direction or multiple lateral direction of venting of the cavities of the respective cogs can be tailored to suit the position of a given cog with respect to adjacent bicycle structure and/or adjacent cog assemblies. Preferably, when assembled in a cassette stack or multiple geared configuration, cogs 120, 200, 300 are oriented to dispel debris from each individual cog in a manner that dispels the debris from the cassette assembly and/or into the venting arrangement of adjacent cogs. Such a configuration reduces the potential for compacting debris within the cassette assembly and/or between adjacent respective cog and/or between the cog and adjacent bicycle structures so as to maintain operability of the venting arrangement of each cog associated with a respective gear cluster.

It is further appreciated that although the web wall of each of cogs 120, 200, 300 are shown as being staggered about the circumference of the respective cogs with respect to the opposite lateral sides thereof, other arrangements of the web walls, such as a greater number being positioned on one side relative to the other lateral side are possible. Although each of cogs 120, 200, 300 are shown as having vents that direct material one or both sides of the respective cogs being oriented generally symmetrically about the circumference of the respective cog, it is further appreciated that other patterning of the vents is possible such that two or more adjacent vents direct to a first side and a second set of adjacent vents direct material to the opposite side of the respective cog. Such alternatives are within the scope of the appending claims.

Therefore, one embodiment of the invention includes a power train cog having a hub portion and a drive portion. The drive portion of the hub is constructed to drivingly interact with a belt and oriented circumferentially about the hub portion. The drive includes a plurality of lug cavities that are shaped to receive a tooth of the belt and at least one vent that is fluidly connected to a respective lug cavity. The vent is shaped to direct debris from the lug cavity, when a tooth interacts with the lug cavity, in a direction having both a radial component and a lateral component.

Another embodiment of the invention combinable with one or more of the features or embodiments above includes a cog assembly of a bicycle power train. The cog assembly includes a body having an axis of rotation that is normal to a plane of rotation of the body. An opening is formed in the body to secure the body to a bicycle. A plurality of drive walls are oriented to engage a tooth of a belt and each drive wall is oriented to extend in a direction that crosses the plane of rotation of the body. A first web wall extends in a circumferential direction between adjacent drive walls and a first debris port that is bounded by adjacent drive walls and the first web wall is shaped to direct debris out of the body in a crossing direction relative to the plane of rotation of the body.

Another embodiment of the invention that is combinable with one or more of the features or embodiments above includes a method of removing debris from a belt driven bicycle power train. A drive face is formed about a circumferential area of a cog. The drive face is shaped to include a plurality of cavities that are each shaped to drivingly interact with a tooth of a belt. At least one, and preferably a number of, and more preferably all of the cavities are vented to atmosphere to discharge debris from the given cavity in a radially inward and lateral direction relative to a plane of rotation of the cog.

The present invention has been described above in terms of the preferred embodiment. It is recognized that various alternatives and modifications may be made to these embodiments which are within the scope of the appending claims.

What is claimed is:

1. A power train cog assembly comprising:
   a belt including a plurality of teeth; and
   a power train cog including:
      a hub portion; and
      a drive portion that is constructed to drivingly interact with the belt and oriented circumferentially about the hub portion, the drive portion comprising:
         a plurality of lug cavities each shaped to receive a tooth of the plurality of teeth of the belt, wherein the tooth substantially fills a volume of a lug cavity of plurality of lug cavities when engaged with a respective lug cavity and the lug cavity extends across the entire lateral width of the power train cog, wherein the plurality of lug cavities comprises a first lug cavity and a second lug cavity facing opposite lateral sides of the hub portion; and
         at least one vent fluidly connected to each respective lug cavity of the plurality of lug cavities and shaped to direct debris from the lug cavity when a tooth of the plurality of teeth interacts with the lug cavity, such that the debris is directed in a direction having both an inward radial component and an outward lateral component relative to the hub portion, and a portion of the at least one vent connected to the lug cavity extends across the entire lateral width of the power train cog;
   wherein the at least one vent for a particular respective lug cavity directs debris to only one side of the drive portion.

2. The power train cog assembly of claim 1, wherein the hub portion is configured to be attached to at least one of a crankset and a wheel hub of a bicycle.

3. The power train cog assembly of claim 1, wherein the at least one vent comprises a convex portion.

4. The power train cog assembly of claim 1, wherein the at least one vent comprises a concave portion.

5. The power train cog assembly of claim 4, wherein the at least one vent comprises a convex portion.

6. The power train cog assembly of claim 1, wherein the at least one vent is located between the hub portion and the respective lug cavity.

7. The power train cog of assembly claim 6, wherein the respective lug cavity comprises a first drive wall, a second drive wall, and a web wall between the first drive wall and the second drive wall.

8. The power train cog of assembly claim 1, wherein a circumferential cross section of each of the plurality of lug cavities at an outer edge of the drive portion is configured to be substantially filled by the tooth of the belt.

9. The power train cog of assembly claim 8, wherein the tooth of the belt is configured to force the debris into the lug cavity of the plurality of lug cavities when the tooth engages the lug cavity.

* * * * *